United States Patent [19]

Tyler

[11] B  4,000,663
[45] Jan. 4, 1977

[54] DAMPER ACTUATOR
[75] Inventor: Hugh J. Tyler, Santa Ana, Calif.
[73] Assignee: Robertshaw Controls Company, Richmond, Va.
[22] Filed: Aug. 22, 1974
[21] Appl. No.: 499,786
[44] Published under the second Trial Voluntary Protest Program on March 16, 1976 as document No. B 499,786.
[52] U.S. Cl. .................... 74/424.8 VA; 251/58; 251/134
[51] Int. Cl.² ........................ F16K 31/04
[58] Field of Search ............ 74/424.8 R, 424.8 VA; 251/134, 58

[56] References Cited

UNITED STATES PATENTS

| | | | |
|---|---|---|---|
| 2,422,495 | 6/1947 | Morrow | 74/424.8 R |
| 2,938,402 | 5/1960 | Willmore | 74/424.8 R |
| 3,258,985 | 7/1966 | Jordan | 74/424.8 R |
| 3,640,140 | 2/1972 | Gulick et al. | 74/424.8 VA |
| 3,720,295 | 3/1973 | Balz | 251/134 X |

Primary Examiner—Arnold Rosenthal
Attorney, Agent, or Firm—Fulwider, Patton, Rieber, Lee & Utecht

[57] ABSTRACT

There is disclosed a mechanical transducer which is particularly adapted for use as an actuator for a damper in a ventilating system. The transducer comprises a housing having a motor drive unit with a rotary shaft output therefrom carried on one wall of the housing and in driving connection to a lead screw which is rotatably carried by thrust bearing means on the wall of said housing. A traveling nut member is engaged on the lead screw and a tubular work output member extends through an opposite wall of the housing in generally co-axial alignment with the lead screw. The inboard end of the tubular member is secured to the traveling nut member whereby the lead screw it totally enclosed. The outboard end of the tubular member bears a work-receiving means which, preferably, is a tapped plug for removable attachment to an actuating lever of the damper unit. The housing also contains the electronic controls for the motor drive unit, including an electrical feedback circuit having a variable, passive electrical component such as a variable resistor with a slider mounted thereon which is mechanically connected to the traveling nut member. In its preferred embodiment, the circuit board is positioned in the housing above the lead screw and the slider bears downwardly projecting arm means mechanically linked to the traveling nut member. This construction greatly facilitates the installation and service of the device since the circuit board and associated slider can simply be lifted out of and returned into engagement with the traveling nut member through the upper, open end of the housing which is covered with a removable cover member.

10 Claims, 4 Drawing Figures

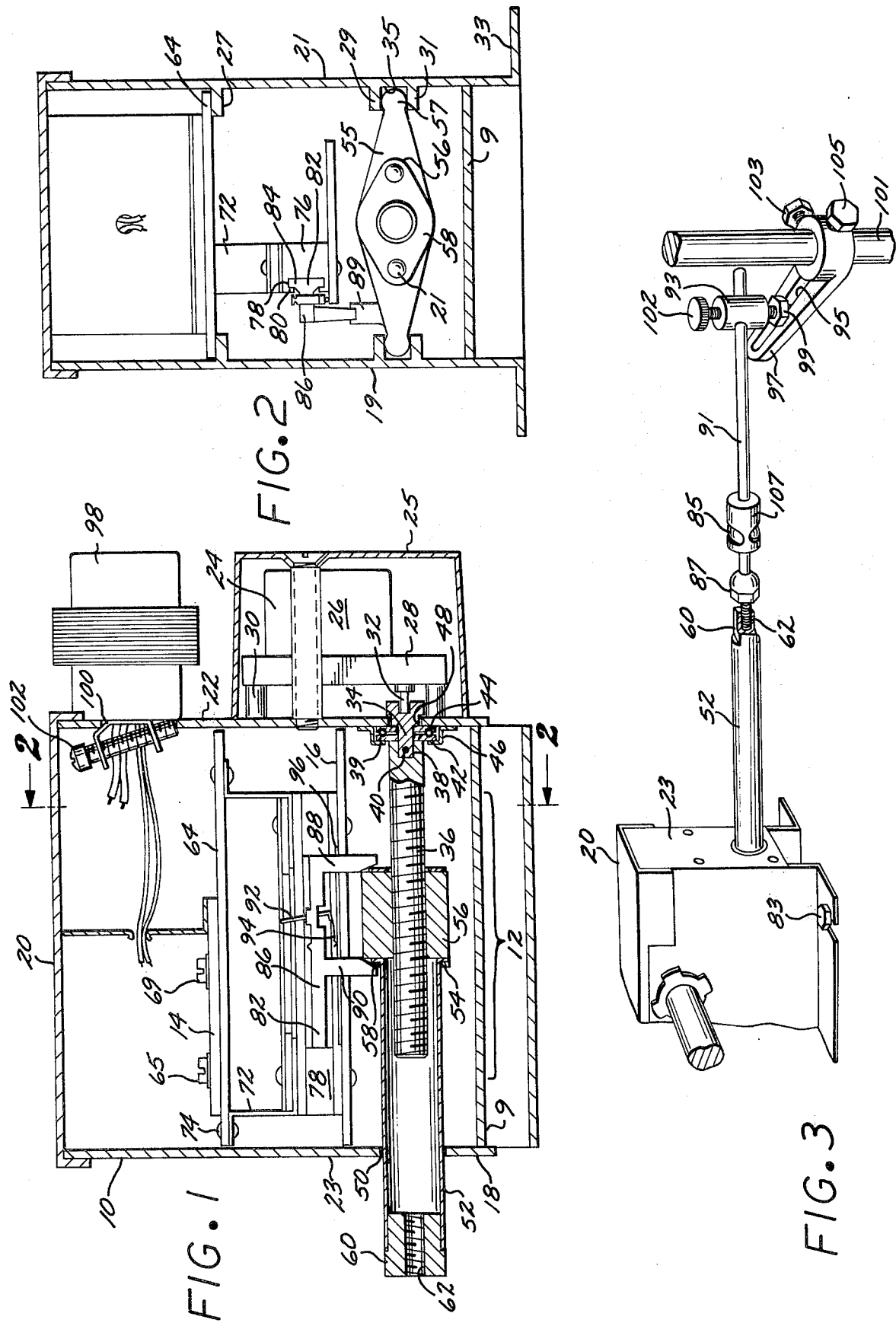

DAMPER ACTUATOR

BACKGROUND OF THE INVENTION

1. Field of the Invention:

This invention relates to a mechanical transducer and, in particular, to such a mechanical device which is particularly adapted for use as the actuator for a damper of a ventilation system.

2. Description of the Prior Art:

Multiple zone air conditioning systems typically have air heating and air cooling equipment in plenum chambers of air circulating systems. The air circulating systems have a blower and duct and damper means whereby a controlled circulation of air to the individual zones of multiple zone systems can be achieved. The dampers of such systems generally have a baffle member that is driven between open and closed positions by a reversible electrical motor which is controlled by suitable thermostat circuits.

Various mechanical drives have been employed for the baffle member of the dampers, including lead screw and traveling nut members such as those shown in the following U.S. Pat. Nos. 2,783,702; 2,837,991; and 3,363,536. Typically, the lead screw and traveling nut member utilized in such damper construction are integral components of the damper construction rather than a modular unit which can be removably attached to the damper. In such construction, the lead screw of the traveling nut member is not protected from the environment but, instead, is open and exposed in the damper unit. The threads of this member can, therefore, become clogged with dirt and the like, increasing the resistance to the driver unit and requiring periodic maintenance.

The electronic control circuits for the actuator drive motor are frequently contained in an electrical control box which is remote from the drive motor and its mechanical linkage to the baffle member of the damper. This complicates the installation and repair of the thermostatic control units and complicates the feedback system whereby the actuator motor can be proportionally controlled.

Accordingly, there is need for a simple modular unit for the control of the baffle member of a damper which is self-contained and includes the electronic circuit for the control of the actuator motor, the actuator motor and mechanical linkage therefor. Desirably, the components of such a modular unit should be contained in a housing while permitting facile access thereto for installation and servicing.

SUMMARY OF THE INVENTION

This invention provides a mechanical transducer which is ideally suited for use as a modular unit for the control of a baffle member of a damper. The mechanical transducer comprises a housing with a motor drive unit mounted on one wall thereof and in driving connection to a lead screw that is rotatably carried by thrust bearing means on the interior wall of the housing. The lead screw bears a traveling nut member which is attached to a tubular, workoutput member that is mounted generally co-axially with the lead screw and that extends through an opening in the opposite wall of the housing. The tubular member has a closed outboard end bearing work-receiving means such as a plug bearing threaded means for the removeable attachment of an actuation lever from the baffle of a damper unit.

When threaded means are employed, the tubular member is, preferably, rotatably carried on the traveling nut member. A preferred means for such attachment comprises a peripheral flange on the inboard end of the tubular member which is secured by a retainer ring attached to said traveling nut member. The lead screw is mounted in the housing by thrust bearing means formed with a single roller bearing means that is engaged between the interior wall of the housing and a ring collar member mounted on the wall. The motor drive unit is connected to the lead screw by a stub shaft which has its inboard end in roll-pin engagement with the lead screw and the thrust bearing means is operative to provide a thrust bearing support for a shoulder on the inboard end of the stub shaft as well as the opposed end of the lead screw.

The housing unit preferably contains the terminal contactor panel as well as the electronic circuit control for the drive motor. The electronic control circuit includes an electrical feedback circuit which has a variable, passive component such as a variable capacitor or variable resistor and the wiper member of such passive electronic component is carried by a slider which is mechanically connected to the traveling nut member. Preferably, the terminal contactor panel and control circuit are contained within the housing overlying the lead screw and traveling nut member and the slider bears downwardly directed arm means which project into mechanical interconnection with the traveling nut member. Installation and servicing of the actuator is facilitated by modular unit housing the mechanical and electronic components and by the simple mechanical interconnection between such components.

BRIEF DESCRIPTION OF THE DRAWINGS

The invention will be described by reference to the presently preferred and illustrated embodiment thereof shown in the figures of which:

FIGS. 1 and 2 are elevational sectional views from the side and end, respectively, of the modular unit;

FIG. 3 is a view of the damper connections to the modular unit of the invention.

DESCRIPTION OF THE PREFERRED EMBODIMENTS

Figure 4:
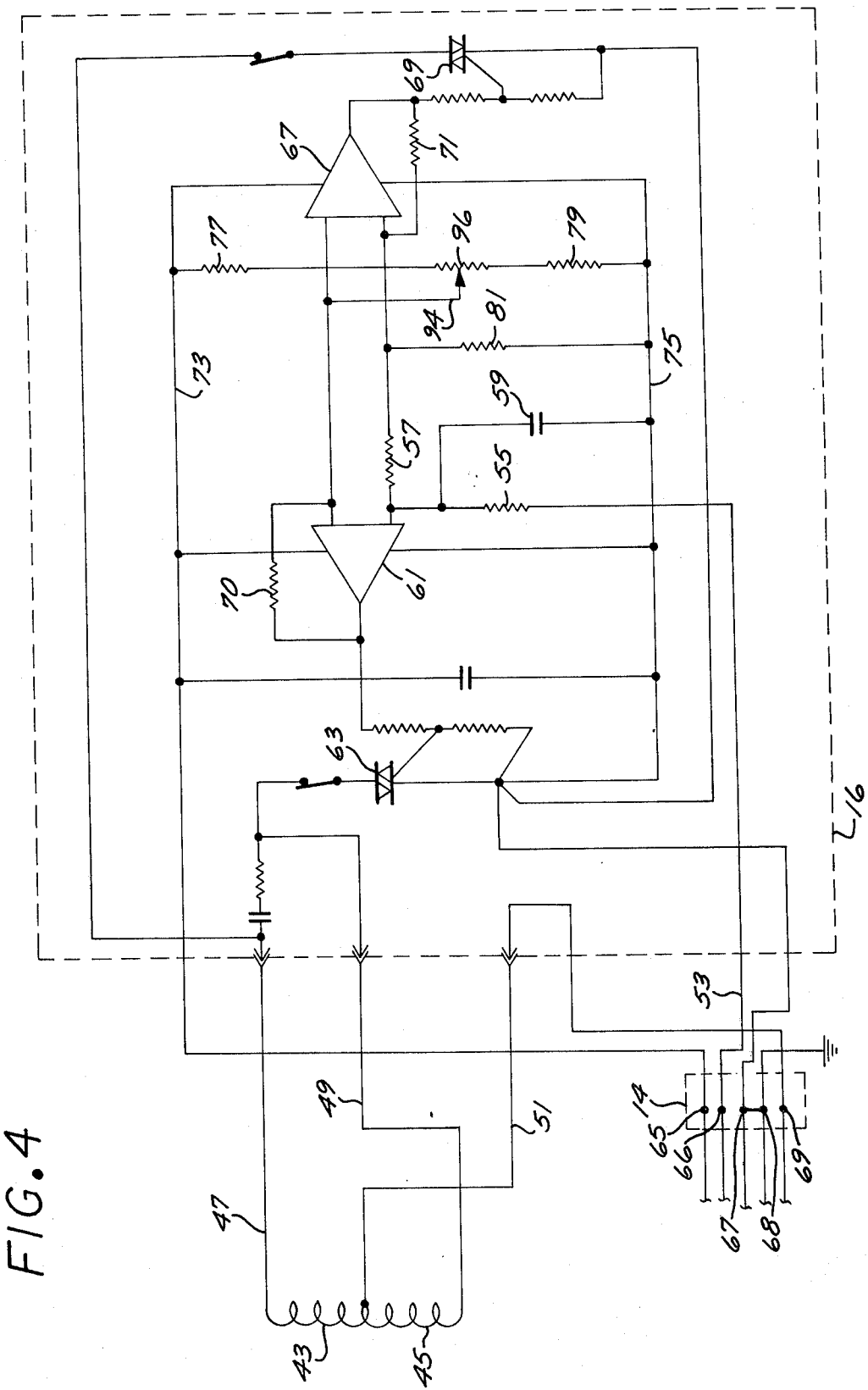
FIG. 4 is a schematic of a preferred electronic control circuit for the unit.

Referring now to FIGS. 1 and 2, the modular, damper actuation control unit 10 comprises a mechanical transducer generally indicated at 12, a terminal contactor panel 14 and an electronic circuit board 16. The components are carried by housing 18 which is shown as a box having an upper open end bearing a cover plate 20 removeably attached thereto and a bottom wall 9. One wall 22 of the housing bears a motor drive unit 24 formed of a reversible electrical motor 26 with an appropriate gear reduction unit 28. The drive unit 24 can be carried on an exterior wall of the housing with machine bolts, screws, rivets or the like (not shown) which extend through bushings 30. The output shaft 32 of the motor drive unit is in driving interconnection to stub shaft 34 by suitable means such as a splined fit or key means engaged in the outboard face of stub shaft 34.

Lead screw 36 is rotatably carried by thrust bearing means 39 on the interior wall 22 of the housing. The lead screw is bored at 38 to receive the inboard end of stub shaft 34 and is mechanically locked to this stub shaft by suitable means such as by roll pin 40 which is fitted into a bore extending through lead screw 36 and the inboard end of stub shaft 34. The thrust bearing means 39 comprises a roller bearing race having inboard and outboard thrust faces 42 and 44, respectively. Outboard thrust plate 44 bears against the inside surface of wall 22 while the inboard thrust plate 42 bears against a ring retainer member 46 which is mounted on wall 22. Stub shaft 34 has an annular shoulder 48 which bears against thrust plate 44 while the mating end of lead screw 36 bears against thrust plate 42. In this manner, a single thrust bearing means 39 provides thrust bearing support for axial loads applied to lead screw 36 in either direction.

The opposite wall 23 of housing 18 has an aperture 50 in axial alignment with lead screw 36 and tubular member 52 projects through aperture 50 in generally co-axial alignment with lead screw 36. The inboard end of tubular member 52 bears peripheral flange 54 which is seated against a face of the traveling nut member 56. A ring retainer member 58 is secured to traveling nut member 56 by rivets 21 and engages peripheral flange 54 whereby the tubular member 52 is axially secured to traveling nut member 56 but free for rotation thereon. The outboard end of tubular member 52 is closed and bears work attachment means. Preferably, the outboard end of tubular member 52 bears a plug member 60 having means such as tapped bore 62 for the removeable attachment of an actuator lever from the baffle of a damper. Plug 60 or the outboard end of tube 52 can bear suitable means such as wrench flats (not shown) to facilitate the attachment of an actuator lever from the damper.

The entire mechanical transducer 12 can thus be seen to be totally enclosed. The motor drive unit is enclosed by a suitable cover 25 that is carried on the outside of wall 22. The lead screw is contained within housing 18 and its inboard end is contained within the tubular member 52 that is secured to the traveling nut member. In this manner, the mechanical components of the modular unit are isolated from the environment and protected from dust and the like.

Referring now to FIG. 2, the housing 18 is formed with side walls 19 and 21 which have a plurality of longitudinal internal ribs 27, 29 and 31 and a base flange 33 having suitable means for the attachment of the modular unit 10 to a supporting structure. The two lowermost ribs 29 and 31 are closely spaced, parallel ribs which define an interior track 35 on the inside side walls of the housing. The traveling nut member 56 bears at least one and, preferably, two radially extending side flanges 55 bearing key means such as the bulbous edge 57 which is in sliding engagement with track 35. In this manner, traveling nut member 56 is restrained against rotation, but free for reciprocal movement, in housing 22.

The upper ribs 27 of the housing form a ledge for the removable support of the electrical components of the modular unit. The electrical components are carried on a metal plate 64 which rests upon the ledge formed by ribs 27. Mounted on plate 64 is the terminal contactor panel 14 which has a plurality of terminal posts 65–69. The underside of plate 64 carries a generally U-shaped bracket 72 secured thereto by suitable means such as rivets 74. The lower surface of bracket 72 carries track means in the form of an elongated block 76 bearing a longitudinal groove 78 with inwardly directed lips 80 that define the track for slider 82. The slider 82 has a key 84 which mates in sliding engagement with track 78 and a central flange 86 projecting therefrom. The undersurface of flange 86 carries downwardly projecting arm means in the form of spaced-apart arms 88 and 90 which project downwardly into engagement with opposite ends of a square boss 89 carried by the traveling nut member 56. Preferably, the lower ends of arms 88 and 90 are slightly tapered on their inside surfaces as shown to faciliate seating of these arms about boss 89.

Slider 82 bears a slot in flange portion 86 intermediate of arms 88 and 90. A generally L-shaped spring member 92 is mounted in this slot and the lower leg of member 92 carries the wiper blade 94 of the variable, passive electronic component, e.g., the wiper contact of a linear resistor 96. The windings of the resistor are preferably coated with a wear-resistant, conductive plastic coating to provide a smooth surface that resists accumulation of dust and dirt.

The housing also supports a suitable transformer 98 which bears a bracket 100 and lock screw 102 mounted thereon whereby the transformer 98 can be secured to wall 22 of the housing by inserting the bracket through an aperture in this wall and tightening lock screw 102 to bind bracket 100 securely in the aperture.

FIG. 3 illustrates a typical connection of the modular unit to a damper shaft. The unit 10 is shown secured to a supporting structure by screws or bolts 83. The outboard end of tubular member 52 carries a ball member 85 on a short shaft from plug 87 which is turned into threads 62 of plug 60. The ball 85 is encompassed by socket 107 of a ball and socket joint. The socket is carried by rod 91 which extends into a slip joint with screw clamp 93. The clamp 93 is slidably carried in slot 95 of crank arm 97 with a lock nut 99 provided for the fixed adjustability of the crank arm length. The crank arm is carried on the damper pivot shaft 101 with lock screws 103 and 105. The damper pivot shaft bears one or more damper blades (not shown) which are locked thereto by suitable means such as a splined fit.

FIG. 4 illustrates the circuit of the modular unit. The terminal contactor 14 is shown as a board having a plurality of connector terminals 65–69. These terminals are connected with suitable leads to contacts of the circuit board 16. The motor 26 is provided with dual windings 43 and 45 which are connected by leads 47 and 49 to terminals on the circuit board 16. A third conductor 51 is connected from the common center of windings 43 and 45 to another terminal on the circuit board.

The control circuit for the motor comprises a bridge circuit having two operational amplifiers 61 and 67 with their outputs connected to trigger triacs in the connector leads to the motor windings whereby current flow can be directed to either of windings 43 and 45 to control the direction of rotation of motor 26. The two amplifiers are coupled in complementary fashion with a dead band to avoid continual operation of the motor with small random variations of the thermostatic input signal.

The error signal from the thermostatic control is applied to terminal 66 of the terminal board which is connected by lead 53 through resistor 55 to the number 2 terminal of the left operational amplifier. Suitable amplifiers which can be used for this circuit are $\mu$A 741, available from Fairchild Semiconductor, Inc.

The input signal is also connected through resistor 57 to the number 3 terminal of the right operational amplifier. Filtering circuit means are provided to suppress momentary peak voltages which may be present in the input thermostatic error signal such as capacitor 59 and the aforementioned resistor 55. The output of the left operational amplifier 61 is connected to the gate terminal of the left triac 63 and to a feedback circuit through resistor 70 to the terminal number 3 of the amplifier 61. Similarly, the output of the right operational amplifier 67 is connected to the gate terminal of triac 69 and to a feedback circuit through resistor 71.

The voltage for the amplifiers is provided from terminal 65 which is supplied with a suitable direct current voltage, typically 24 volts D.C. The motor windings are supplied with 24 volts A.C. through terminals 68 and 69. Terminal 68 is grounded and terminal 69 is connected to lead 51 to the common terminal of windings 43 and 45. The ground lead from terminal 67 is connected to the main terminals of triacs 63 and 69. The other main terminals of triacs 63 and 69 are connected to their respective motor windings, triac 63 being connected through motor winding 45 by lead 49 and triac 69 being connected through motor winding 43 by lead 47. The variable resistor 96 with its wiper contact 94 is shown as connected across lead 73 and ground lead 75 in series with high value resistors 77 and 79.

Resistor 57 is in series with resistors 55 and 81 to serve as a voltage dropping circuit and impose a slightly lower voltage on terminal 3 of the right operational amplifier than that imposed on terminal 2 of the left operational amplifier 61. Typically, the difference in potential applied to these amplifiers can be about 0.05 volts. This difference in voltage potential serves to provide a dead band and avoid rapid switching of the operational amplifiers and continuing reversing rotation of the motor when the signal is at or near the balancing voltage.

The circuit as thus described operates in response to a voltage input at terminal 66, e.g., an input voltage of approximately 13 volts. This provides an output signal from amplifier 67 which is sufficient to trigger the triac 69 into conduction and supply 24 volts alternating current to motor winding 43 through lead 47. The amplifier is stabilized or latched onto its on position by positive feedback through resistor 71 to terminal 3 of the amplifier.

The current flow through winding 43 of the motor causes the motor to turn in a counterclockwise position, repositioning the damper through tubular member 52, increasing cool air flow and decreasing the warm air flow. The movement of the traveling nut member also effects movement of the wiper contact 94 on the variable resistor 96. This results in a progressively increasing voltage being imposed on terminal 2 of the operational amplifier 67. As terminal 2 approaches the higher voltage level of terminal 3, the amplifier is biased into a nonconducting mode and the triac 69 opens the circuit to the motor windings. The amplifier is stabilized in this off mode by the reduction of the potential applied to terminal 3 resulting from the stopping of feedback voltage through resistor 71. the resultant latch-off action is designed to produce about 0.025 volt change so that the circuit is in a nonconducting mode at the center of the resulting dead band, thereby requiring that the input error signal must change by at least 0.025 volts before the amplifiers 61 or 67 will be biased into a conducting mode.

The invention has been described by reference to the illustrated and presently preferred mode of practice thereof. It is not intended that this illustration and description be construed as unduly limiting of the invention. Instead, it is intended that the invention be defined by the means, and their obvious equivalents, set forth in the following claims.

What is claimed is:

1. A mechanical transducer comprising:
a housing having parallel side walls and end walls;
a motor drive unit with a rotary shaft output carried on one end wall thereof;
a lead screw rotatably carried by thrust bearing means on said end wall and in driven connection to said rotary shaft;
track means defined by channels on opposite side walls parallel to and coextensive with said lead screw;
a traveling nut member engaged on said lead screw and bearing opposite, radially extending side flanges with outboard bulbous edges engaged in said channels;
a tubular member carried by said traveling nut member generally coaxially with said lead screw and extending through the opposite end wall of said housing; and
said tubular member having a closed outboard end bearing work receiving means.

2. The transducer of claim 1 wherein:
said work receiving means comprises a plug bearing threaded means for the removeable attachment of a working member.

3. The transducer of claim 2 wherein:
said tubular member is rotatably carried on said traveling nut member.

4. The transducer of claim 3 wherein:
said tubular member bears a peripheral flange and is carried on said traveling nut member by a retainer ring engaging about said flange.

5. The transducer of claim 1 wherein:
said traveling nut member has at least one radially extending flange with track means on at least one inner side wall of said housing engaging said flange to restrain said traveling nut member against rotation.

6. The transducer of claim 1 wherein:
said one end wall bears a ring retainer member surrounding the end of said lead screw and wherein said thrust bearing means comprises a roller bearing race having opposite thrust faces captured between said ring retainer member and said one end wall.

7. The transducer of claim 6 wherein:
said working receiving means comprises a plug bearing threaded means for the removable attachment of a working member.

8. The transducer of claim 7 wherein:
said tubular member is rotatably carried on said traveling nut member.

9. The transducer of claim 8 wherein:
said tubular member bears a peripheral flange and is carried on said traveling nut member by a retainer ring engaging about said flange.

10. The transducer of claim 6 wherein:
said motor is mounted on the exterior of said one end wall and includes a stub shaft member in driven connection thereto and extending through said one end wall with its inboard end in roll pin engagement with said lead screw.

* * * * *